(12) United States Patent
Stracca et al.

(10) Patent No.: US 12,143,204 B2
(45) Date of Patent: Nov. 12, 2024

(54) CPRI DATA BLOCK TRANSMISSION METHOD AND APPARATUS

(71) Applicant: Telefonaktiebolaget LM Ericsson (PUBL), Stockholm (SE)

(72) Inventors: Stefano Stracca, Pisa (IT); Fabio Cavaliere, Pisa (IT); Paolo Debenedetti, Genoa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 483 days.

(21) Appl. No.: 17/423,933

(22) PCT Filed: Jan. 29, 2019

(86) PCT No.: PCT/EP2019/052107
§ 371 (c)(1),
(2) Date: Jul. 19, 2021

(87) PCT Pub. No.: WO2020/156642
PCT Pub. Date: Aug. 6, 2020

(65) Prior Publication Data
US 2022/0021472 A1    Jan. 20, 2022

(51) Int. Cl.
*H04L 1/00* (2006.01)
*H04J 3/16* (2006.01)
*H04L 25/49* (2006.01)

(52) U.S. Cl.
CPC .......... *H04J 3/1652* (2013.01); *H04L 1/0041* (2013.01); *H04L 25/4908* (2013.01); *H04J 2203/0085* (2013.01)

(58) Field of Classification Search
None
See application file for complete search history.

(56) References Cited

U.S. PATENT DOCUMENTS

| | | | |
|---|---|---|---|
| 2013/0100948 A1* | 4/2013 | Irvine | H04W 88/085 370/350 |
| 2017/0005949 A1* | 1/2017 | Gareau | H04L 12/413 |
| 2018/0097659 A1* | 4/2018 | Hanson | H04L 49/351 |
| 2018/0167160 A1 | 6/2018 | Gareau et al. | |
| 2018/0192323 A1* | 7/2018 | Zhang | H04W 28/065 |

(Continued)

FOREIGN PATENT DOCUMENTS

| | | |
|---|---|---|
| CN | 106411454 A | 2/2017 |
| CN | 108092739 A | 5/2018 |
| CN | 108243128 A | 7/2018 |

(Continued)

OTHER PUBLICATIONS

First Office Action Notification issued for Chinese Application No. 201980090730.6—Jul. 1, 2023.

(Continued)

*Primary Examiner* — Abdelillah Elmejjarmi
(74) *Attorney, Agent, or Firm* — Baker Botts L.L.P.

(57) ABSTRACT

Methods and apparatus are provided for transmitting data. In one aspect, a method of transmitting data comprises identifying a start of a Common Public Radio Interface (CPRI) frame, identifying CPRI data blocks of the CPRI frame, and transmitting the CPRI data blocks of the CPRI frame in slots of a FlexE calendar of a Flex Ethernet physical layer group (FlexE PHY group).

22 Claims, 6 Drawing Sheets

(56) References Cited

U.S. PATENT DOCUMENTS

2019/0181999 A1* 6/2019 Du .................... H04L 12/413
2021/0203588 A1* 7/2021 Zhong .................. H04L 7/041

FOREIGN PATENT DOCUMENTS

WO     2018 121224 A1   7/2018
WO     2018 171642 A1   9/2018

OTHER PUBLICATIONS

Search Report issued for Chinese Application No. 2019800907306—Jun. 29, 2023.
CPRI Specification v7.0; Interface Specification; Common Public Radio Interface (CPRI); Interface Specification—Oct. 9, 2015.
PCT Notification of Transmittal of the International Search Report and the Written Opinion of the International Searching Authority, or the Declaration issued for International application No. PCT/EP2019/052107—Oct. 22, 2019.
Optical Internetworking Forum, Flex Ethernet 2.0, Implementation Agreement—Jun. 22, 2018.
PCT International Search Report issued for International application No. PCT/EP2019/052107—Oct. 22, 2019.
International Telecommunication Union, Telecommunication Standardization Sector, Study Period 2017-2020, SG15-C.169, Study Group 15; Contribution; Source: China Mobile, et al.; Title: Architecture Requirement of 5G transport network (Geneva)—Jun. 19-30, 2017.
PCT Written Opinion of the International Searching Authority issued for International application No. PCT/EP2019/052107—Oct. 22, 2019.

* cited by examiner

| Input Data | Sync | Block Payload | | | | | | | |
|---|---|---|---|---|---|---|---|---|---|
| Bit Position: <br> Data Block Format: | 0 1 | 2 | | | | | | | 65 |
| $D_0 D_1 D_2 D_3 D_4 D_5 D_6 D_7$ | 01 | $D_0$ | $D_1$ | $D_2$ | $D_3$ | $D_4$ | $D_5$ | $D_6$ | $D_7$ |
| Control Block Formats: | | Block Type Field | | | | | | | |
| $C_0 C_1 C_2 C_3 C_4 C_5 C_6 C_7$ | 10 | 0x1E | $C_0$ | $C_1$ | $C_2$ | $C_3$ | $C_4$ | $C_5$ | $C_6$ | $C_7$ |
| $S_0 D_1 D_2 D_3 D_4 D_5 D_6 D_7$ | 10 | 0x78 | | $D_1$ | $D_2$ | $D_3$ | $D_4$ | $D_5$ | $D_6$ | $D_7$ |
| $O_0 D_1 D_2 D_3 Z_4 Z_5 Z_6 Z_7$ | 10 | 0x4B | | $D_1$ | $D_2$ | $D_3$ | $O_0$ | 0x000_0000 | | |
| $T_0 C_1 C_2 C_3 C_4 C_5 C_6 C_7$ | 10 | 0x87 | | | $C_1$ | $C_2$ | $C_3$ | $C_4$ | $C_5$ | $C_6$ | $C_7$ |
| $D_0 T_1 C_2 C_3 C_4 C_5 C_6 C_7$ | 10 | 0x99 | $D_0$ | | | $C_2$ | $C_3$ | $C_4$ | $C_5$ | $C_6$ | $C_7$ |
| $D_0 D_1 T_2 C_3 C_4 C_5 C_6 C_7$ | 10 | 0xAA | $D_0$ | $D_1$ | | | $C_3$ | $C_4$ | $C_5$ | $C_6$ | $C_7$ |
| $D_0 D_1 D_2 T_3 C_4 C_5 C_6 C_7$ | 10 | 0xB4 | $D_0$ | $D_1$ | $D_2$ | | | $C_4$ | $C_5$ | $C_6$ | $C_7$ |
| $D_0 D_1 D_2 D_3 T_4 C_5 C_6 C_7$ | 10 | 0xCC | $D_0$ | $D_1$ | $D_2$ | $D_3$ | | | $C_5$ | $C_6$ | $C_7$ |
| $D_0 D_1 D_2 D_3 D_4 T_5 C_6 C_7$ | 10 | 0xD2 | $D_0$ | $D_1$ | $D_2$ | $D_3$ | $D_4$ | | | $C_6$ | $C_7$ |
| $D_0 D_1 D_2 D_3 D_4 D_5 T_6 C_7$ | 10 | 0xE1 | $D_0$ | $D_1$ | $D_2$ | $D_3$ | $D_4$ | $D_5$ | | $C_7$ |
| $D_0 D_1 D_2 D_3 D_4 D_5 D_6 T_7$ | 10 | 0xFF | $D_0$ | $D_1$ | $D_2$ | $D_3$ | $D_4$ | $D_5$ | $D_6$ | |

| Input Data | Sync | Block Payload | | | | | | | |
|---|---|---|---|---|---|---|---|---|---|
| Bit Position: <br> Data Block Format: | 0 1 | 2..9 | 10..17 | 18..25 | 26..33 | 34..41 | 42..49 | 50..57 | 58..65 |
| $D_0 D_1 D_2 D_3 / D_4 D_5 D_6 D_7$ | 0 1 | D0 | D1 | D2 | D3 | D4 | D5 | D6 | D7 |
| Control Block Formats: | | Block Type Field | | | | | | | |
| $D_0 D_1 D_2 D_3 / D_4 D_5 D_6 T_7$ | 1 0 | 0xFF | D0 | D1 | D2 | D3 | D4 | D5 | D6 |
| $S_0 D_1 D_2 D_3 / D_4 D_5 D_6 D_7$ | 1 0 | 0x78 | D1 | D2 | D3 | D4 | D5 | D6 | D7 |

CPRI DATA BLOCK TRANSMISSION METHOD AND APPARATUS

PRIORITY

This nonprovisional application is a U.S. National Stage Filing under 35 U.S.C. § 371 of International Patent Application Serial No. PCT/EP2019/052107 filed Jan. 29, 2019 and entitled "CPRI DATA BLOCK TRANSMISSION METHOD AND APPARATUS" which is hereby incorporated by reference in its entirety.

TECHNICAL FIELD

Examples of the present disclosure relate to transmitting data, such as Common Public Radio Interface (CPRI) frames using Flex Ethernet (FlexE).

BACKGROUND

The Flexible Ethernet (FlexE) Implementation Agreement 2.0 defined by the Optical Internetworking Forum (OIF), which is incorporated herein by reference, provides a mechanism for supporting a variety of Ethernet MAC rates that may or may not correspond to any existing Ethernet PHY rate. This includes MAC rates that are both greater than (through bonding) and less than (through sub-rate and channelization) the Ethernet PHY rates used to carry FlexE. A PHY is an implementation of a physical layer, such as for example an optical communications link or a wireless connection between devices. The Implementation Agreement defines FlexE Client MAC rates of 10, 40, and m×25 Gb/s, and defines that a FlexE Group may comprise 1 to n bonded Ethernet PHYs.

The Common Public Radio Interface (CPRI) is aimed at defining a publicly available specification for the key internal interface of radio base stations between the Radio Equipment Control (REC) and the Radio Equipment (RE). CPRI Specification v7.0 is incorporated herein by reference.

SUMMARY

One aspect of the present disclosure provides a method of transmitting data. The method comprises identifying a start of a Common Public Radio Interface (CPRI) frame, and identifying CPRI data blocks of the CPRI frame. The method also comprises transmitting the CPRI data blocks of the CPRI frame in slots of a FlexE calendar of a Flex Ethernet physical layer group (FlexE PHY group).

A further aspect of the present disclosure provides method of receiving data. The method comprises receiving data in slots of a FlexE calendar of a Flex Ethernet physical layer group (FlexE PHY group), identifying a start of a Common Public Radio Interface (CPRI) frame in the data, and identifying CPRI data blocks of the CPRI frame in the data.

An additional aspect of the present disclosure provides apparatus for transmitting data. The apparatus comprises a processor and a memory. The memory contains instructions executable by the processor such that the apparatus is operable to identify a start of a Common Public Radio Interface (CPRI) frame, identify CPRI data blocks of the CPRI frame, and transmit the CPRI data blocks of the CPRI frame in slots of a FlexE calendar of a Flex Ethernet physical layer group (FlexE PHY group).

Another aspect of the present disclosure provides apparatus for receiving data. The apparatus comprises a processor and a memory. The memory contains instructions executable by the processor such that the apparatus is operable to receive data in slots of a FlexE calendar of a Flex Ethernet physical layer group (FlexE PHY group), identify a start of a Common Public Radio Interface (CPRI) frame in the data, and identify CPRI data blocks of the CPRI frame in the data.

A further aspect of the present disclosure provides apparatus for transmitting data. The apparatus is configured to identify a start of a Common Public Radio Interface (CPRI) frame, identify CPRI data blocks of the CPRI frame, and transmit the CPRI data blocks of the CPRI frame in slots of a FlexE calendar of a Flex Ethernet physical layer group (FlexE PHY group).

A still further aspect of the present disclosure provides apparatus for receiving data. The apparatus is configured to receive data in slots of a FlexE calendar of a Flex Ethernet physical layer group (FlexE PHY group), identify a start of a Common Public Radio Interface (CPRI) frame in the data, and identify CPRI data blocks of the CPRI frame in the data.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Figure 1:
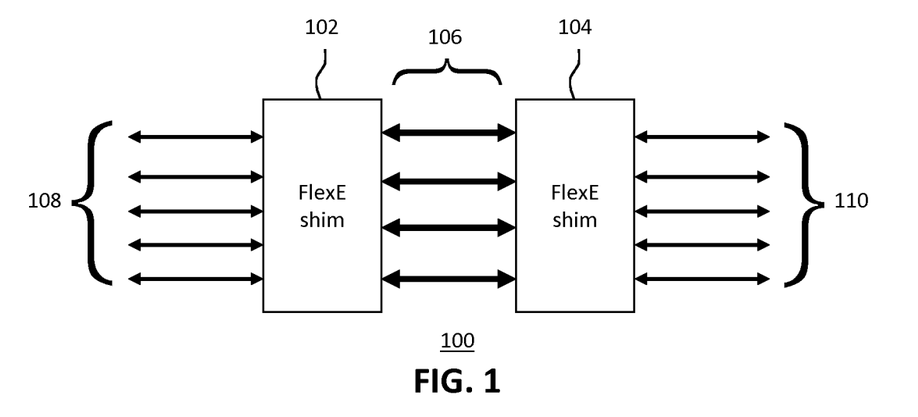
FIG. 1 is a schematic illustration of an example of a FlexE communications system.

FIG. 1 shows an example of a FlexE communications system 100. The system 100 includes a first FlexE shim 102 and a second FlexE shim 104. The FlexE shims 102 and 104 are connected by one or more communication links 106 or PHYs, collectively referred to as a FlexE group. According to the current FlexE standard (Implementation Agreement), a FlexE group may contain between 1 and 254 PHYs.

The first FlexE shim 102 is connected to a number of Ethernet clients 108. The second FlexE shim 10 is connected to the same number of Ethernet clients 110. A client 108 connected to the FlexE shim 102 has a corresponding client 110 connected to the FlexE shim 104, such that the clients may communicate via the shims and over the FlexE group 106.

Figure 2:
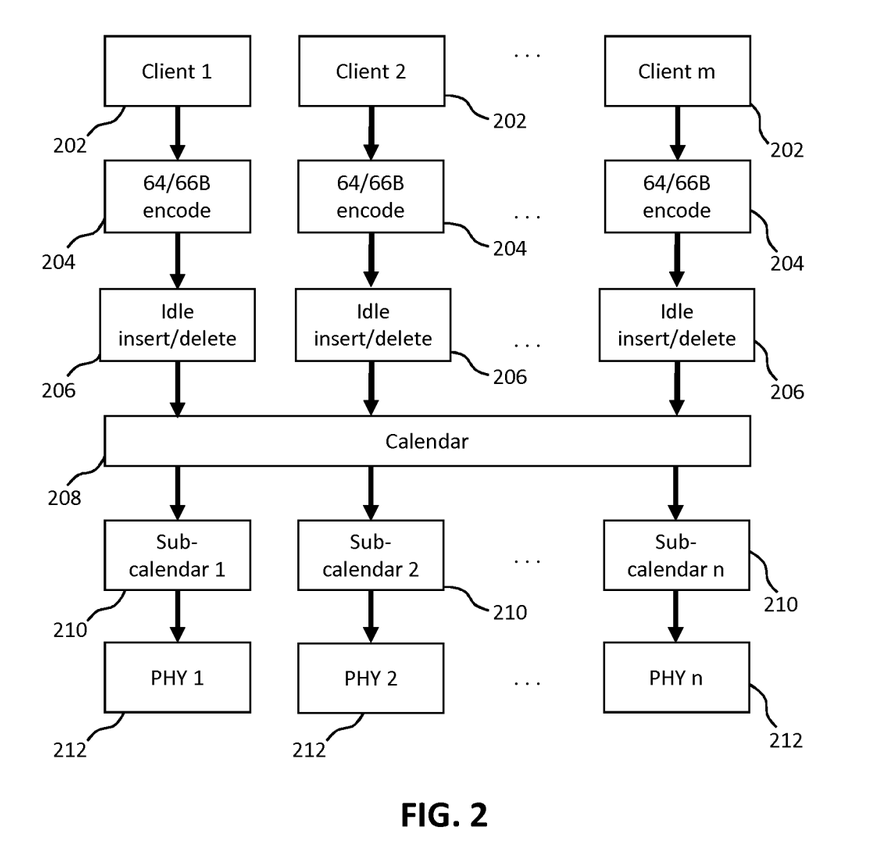
FIG. 2 is a schematic illustration of an example of functions of a FlexE multiplexer.

FIG. 2 shows an example of functions of a FlexE multiplexer (FlexE mux), one or more of which may be implemented by a FlexE shim. A plurality of FlexE clients 202 wish to transmit data to corresponding clients over a PHY or a FlexE group. Each client 202 provides data in the form of 64 bit blocks to a respective 64/66B encode block 204. Each 64/66B encode block 204 encodes 64-bit blocks of data from the respective client as 66-bit blocks, also known as Physical Coding Sublayer (PCS) blocks, and provides the 66-bit blocks to a respective idle insert/delete block 206. The idle insert/delete blocks insert 'idle' control blocks into the data stream when there is no data to transmit from the respective client, and/or when the block rate into calendar function 208 is higher than that provided by the idle insert/delete block 204. The output of each idle insert/delete block 206 is in the form of a stream of 66-bit blocks and is provided to calendar function 208.

The calendar function 208 arranges 66-bit blocks from each idle insert/delete block for scheduling for transmission on the PHYs of a FlexE group. The calendar function provides a respective sub-calendar 210 for each PHY 212 of n PHYs in the FlexE group. Each sub-calendar 210 comprises 66-bit blocks for transmission on a respective PHY 212 of the FlexE group.

The calendar has a granularity of around 5 Gbps, and has a length of 20 slots per 100 Gbps of FlexE group capacity. Therefore, for example, where a FlexE group is made up of n 100 Gbps PHYs, the length of the calendar is 20n slots. Each slot carries a 66-bit block. Two calendar configurations are supported: an "A" and a "B" calendar configuration. At any given time, one of the calendar configurations is used for mapping data clocks from the FlexE clients into the calendar. The two calendar configurations are provided to facilitate reconfiguration.

The sub-calendar for a PHY includes a repeating assignment of twenty 66-bit blocks to the FlexE client flows (data from FlexE clients) that are being carried on that PHY. The slots are numbered 0-19. The blocks transmitted on each PHY also include overhead blocks. One 66-bit overhead block is inserted for every 1023 repetitions of the sub-calendar (i.e. after every 1023×20 66-bit data blocks). Eight 66-bit overhead blocks comprise an overhead frame. 32 overhead frames comprise an overhead multiframe.

An overhead multiframe is arranged as follows. The first 66-bit block in an overhead frame in the multiframe has 0x4B in bits 0-7 and 0x5 in bits 32-35. These two values indicate that the block is the first block in an overhead frame. Each overhead frame also indicates the FlexE group number in which the PHY belongs. The second overhead block (transmitted 1023 sub-calendar repetitions later than the first overhead block) carries PHY information, including a PHY map. There can be 254 PHYs combined in a group (with identification 1-254), and each bit in the 256-bit PHY map indicates whether a PHY with that number exists in the FlexE group. Each overhead frame includes eight bits of the PHY map, and so all of the second overhead frame blocks of the 32-frame overhead multiframe transmit the complete PHY map. The second block of the overhead frame also indicates the PHY number (0-255) of the PHY carrying the overhead frame.

The third block in an overhead frame carries the client distribution information, i.e. the client numbers to which each slot in the 20-slot sub-calendar is assigned. There are twenty 5 Gbps slots in a sub-calendar for a 100 Gbps PHY, so twenty of the third overhead frame blocks in an overhead multiframe are used to indicate which client data each slot carries. There are two calendar configurations, "A" and "B", and so the overhead multiframe indicates, for each of the 20 slots, which client has been assigned that slot for both calendar configurations. The overhead frame also indicates which calendar configuration is currently in use. The bit indicating the calendar in use is repeated three times in the frame to counter transmission errors. Blocks four to eight of the overhead frame are currently reserved for management data.

An overhead block contains a Calendar switch Request (CR) bit that can be used by a sending entity (e.g. sending FlexE shim) to send a request to the receiving entity (eg. Receiving FlexE shim) that a calendar configuration (A or B configuration) other than the one currently being used should be used. An overhead block also contains a Calendar switch Acknowledge (CA) bit used to acknowledge the calendar configuration switch in the reverse direction (i.e. the CA bit is in overhead sent over the PHY in the reverse direction).

The first block in an overhead frame can be used to align incoming data, e.g. determine the slot number of frames following the overhead frame, and determine the slot and overhead frame number for subsequent overhead frames.

Figure 3:
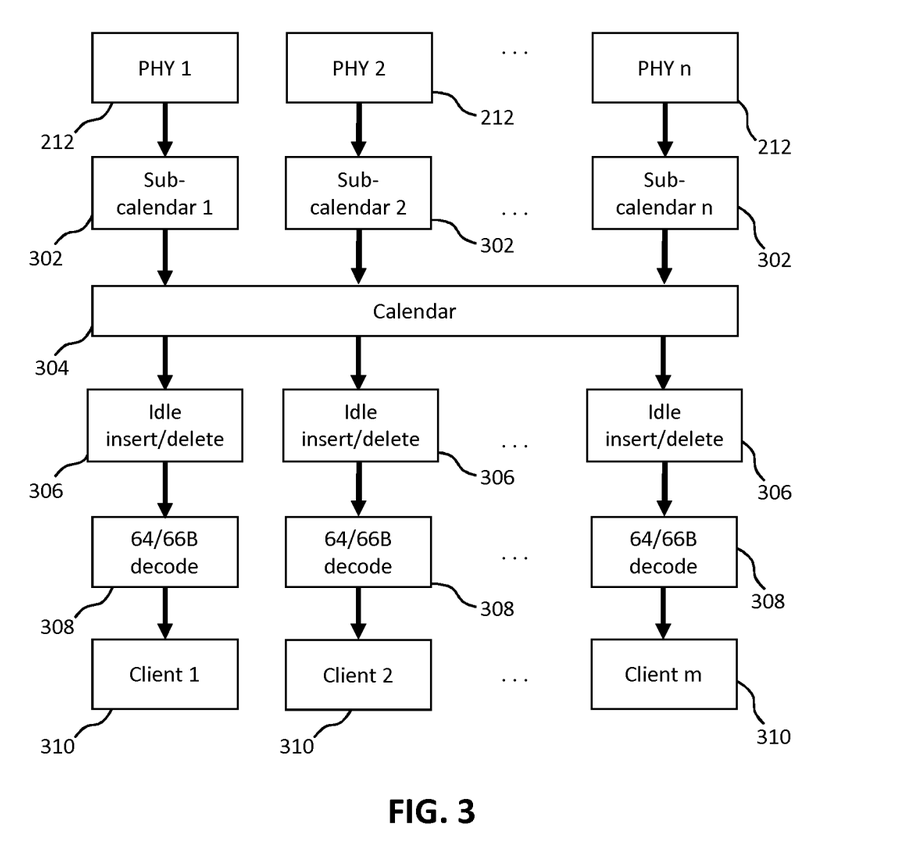
FIG. 3 is a schematic illustration of an example of functions of a FlexE demultiplexer.

FIG. 3 shows an example of functions of a FlexE demultiplexer (FlexE demux), one or more of which may be implemented by a FlexE shim. 66-bit blocks of data are received from each of n PHYs 212 and provided to respective sub-calendars 302.

These are arranged into a calendar 304 that may in some implementations be identical to the calendar 208 shown in FIG. 2. The 66-bit blocks from the calendar (not including overhead blocks) are provided to the appropriate idle insert/delete blocks 306, each of which is associated with a client flow for a client. The idle insert/delete blocks may delete idle control blocks from the stream of blocks from the calendar 304. The output of each idle insert/delete block 306 is provided to a respective 64/66B decode block, which decodes the 66-bit blocks into 64-bit data blocks, and provides the 64-bit blocks to the respective one of m clients 310.

Each client 310 is associated with one of the clients 202 shown in FIG. 1, and associated clients communicate in a bi-directional manner. Therefore, for example, a FlexE shim at one end of the PHYs includes a FlexE mux and a demux, and similarly a FlexE shim at the other end of the PHYs also includes a mux and a demux. Associated clients are identified using the same identifier (e.g. client number) in the calendar client distribution information in the overhead going in both directions between the shims.

The information comprising the PHY map and calendar client distribution information (for both calendars) can be used by a FlexE demux to check that the demux is correctly assigning time slots in which data is received to the correct client, and thus to check that the received data is going to the correct client. The information can also be used by the demux to reconfigure the calendar that is not in use (A or B), as the demux can configure the calendar that is not in use using the information in the overhead. The information is sent to the demux in the overhead by a FlexE mux, and may also be determined by the FlexE mux or a system operator.

Figure 4:
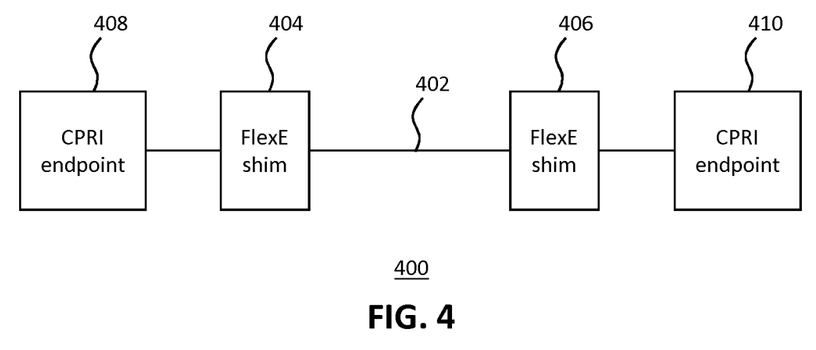
FIG. 4 is a schematic illustration of an example of a communication system.

FIG. 4 shows an example of a communication system 400. According to embodiments of the present disclosure. The communication system comprises a FlexE physical layer group (FlexE PHY group) 402 comprising one or communication links (PHYs) and connecting FlexE shims 404 and 406. FlexE shim 404 is connected to CPRI endpoint 408, and FlexE shim 406 is connected to CPRI endpoint 410. FlexE shims may be connected to a respective CPRI endpoint via any suitable interface. A CPRI endpoint comprises a node that produces or transmits CPRI data and/or receives CPRI data.

In embodiments of the present disclosure, one of the CPRI endpoints, e.g. CPRI endpoint 408, may provide CPRI frames comprising CPRI data blocks to FlexE shim 404. The CPRI data blocks may be transmitted over the FlexE PHY group 402 and received at the other FlexE shim 406. The CPRI data blocks may then be passed to the CPRI endpoint 410. In some examples, CPRI data may additionally or alternatively be transmitted in the opposite direction, e.g. from CPRI endpoint 410 to CPRI endpoint 408 via FlexE shim 406, FlexE PHY group 402 and FlexE shim 404. Each FlexE shim 404 and 406 may in some examples be connected to one or more other nodes such as FlexE clients.

Figure 5:
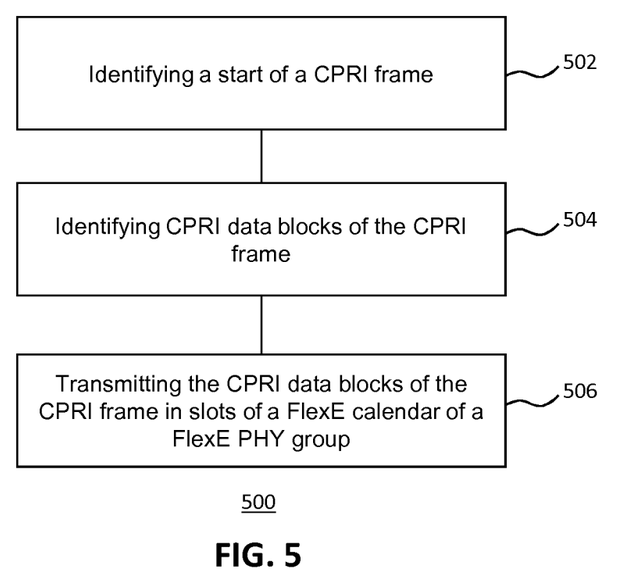
FIG. 5 is a flow chart of an example of a method of transmitting data.

FIG. 5 is a flow chart of an example of a method 500 transmitting data. In some examples, the method 500 may be carried out by a node such as FlexE shim 404 or 406. The method 500 comprises, in step 502, identifying a start of a CPRI frame. In some examples, this may be achieved by identifying a CPRI control block that delimits CPRI frames, e.g. a start of frame CPRI control block. In step 504, the method 500 comprises identifying CPRI data blocks (eg. some or all data blocks) of the CPRI frame. A CPRI frame may have a fixed number of data blocks, for example, and/or may include an end-of-frame block, and/or the start of a next frame may be identified, to determine the CPRI data blocks in the CPRI frame.

The method 500 also comprises, in step 506, transmitting the CPRI data blocks of the CPRI frame in slots of a FlexE calendar of a FlexE PHY group. In some examples, the slots may be assigned, allocated or reserved for the CPRI data blocks (e.g. the slots may be allocated to the CPRI endpoint 408 shown in FIG. 4).

In some examples, transmitting the CPRI data blocks in slots of the FlexE calendar comprises transmitting the CPRI data blocks unmodified. That is, for example, a CPRI data block may be transmitted in the appropriate slot of the FlexE calendar in place of a FlexE data block. In some examples, the CPRI data blocks comprise 64/66B encoded data blocks. Therefore, a 66-bit CPRI data block may be transmitted in a 66-bit FlexE calendar slot unmodified. In other examples, however, other sizes of CPRI data blocks may be used, such as for example 8/10B encoded 10-bit data blocks.

In some examples, a bit rate of the CPRI data blocks is lower than a bit rate of the slots of the FlexE calendar. In such examples, the method 500 may further comprise transmitting additional data blocks in the slots of the FlexE calendar. The additional data blocks may in some examples comprise padding or stuffing blocks. The additional data blocks may in some examples comprise FlexE or CPRI control blocks.

In a particular example, CPRI frames may be produced for transmission according to CPRI line bit rate option 8, at a bit rate of 10137.6 Mbit/s. If two slots are allocated in the FlexE calendar (approx. 5 Gbit/s), the FlexE slots will have a bit rate of 10312.5 Mbit/s. Thus, the CPRI data will be 98.3% of the rate of the allocated slots. In another example, using CPRI line bit rate option 10, with a CPRI data bit rate of 24330.24 Mbit/s, that is 94.4% of the bit rate (25781.25 Mbit/s) of five allocated slots. Thus, additional data blocks such as padding, stuffing or control blocks may be occasionally inserted into the allocated FlexE data blocks, for example where a CPRI data block is not yet available due to the lower bit rate. In other examples, any CPRI line bit rate option nay be used, with the appropriate number of allocated FlexE calendar slots (e.g. with at least the bit rate of the CPRI data).

In some examples, the additional data blocks may include a timestamp and/or indicate a status of a CPRI communication link for the CPRI data blocks. The timestamp may for example be used at either end of the FlexE PHY group to adjust a delay or timing of the CPRI data, data blocks or frames, for example to achieve precise timing or delay over the FlexE PHY group.

In some examples, the slots of the FlexE calendar are reserved for a CPRI interface for the CPRI frame. Referring to FIG. 4, for example, the communication link between the CPRI endpoints 408 and 410 may be referred to as a CPRI interface.

In some examples, the CPRI frame may be obtained from a FlexE client. The FlexE client may be (from the point of view of the FlexE shim 404, for example) a source of data blocks, such as 64/66B encoded data blocks. The data blocks may be CPRI data blocks, having been obtained from a CPRI endpoint in some examples. However, the FlexE shim may simply insert the data blocks into a data stream transmitted over the FlexE PHY group 402 in the appropriate time slots (i.e. the time slots allocated for transmitting the CPRI frame). In some examples, the FlexE client comprises a baseband processing node, a radio equipment control (REC) or a radio equipment (RE) node. Thus, for example, FlexE may be used to transmit FlexE fronthaul data.

In some examples, the slots of the FlexE calendar are substantially evenly spaced in time. This may ensure a lower delay and less jitter in the CPRI data blocks as they are received at a receiving FlexE shim or receiving CPRI endpoint. For example, using CPRI line bit rate option 8, which may use two slots in a FlexE calendar to transmit CPRI data over a FlexE PHY group, slot numbers #1 and #11 (from slots 0-19) may be used as an example. Slots #1 and #11 are substantially evenly spaced in time for the repeating calendar. That is, for example, slot #11 is substantially evenly spaced from both slot #1 in the same instance of the calendar and slot #1 in the next repeated instance of the calendar. In some examples, the blocks in the FlexE calendar comprise non-consecutive blocks.

The method 500 may in some examples comprise obtaining the CPRI data blocks at a rate according to CPRI line bit rate option 8, and wherein transmitting the CPRI data blocks in slots of the FlexE calendar comprises allocating two slots in the FlexE calendar for the CPRI data blocks. Alternatively, the method 500 may comprise obtaining the CPRI data blocks at a rate according to CPRI line bit rate option 10, and wherein transmitting the CPRI data blocks in slots of the FlexE calendar comprises allocating five slots in the FlexE calendar for the CPRI data blocks. In some examples the line bit rate option may change over time.

In some examples, transmitting the CPRI data blocks in slots of the FlexE calendar comprises transmitting the CPRI data blocks to a CPRI endpoint, and the method comprises receiving further CPRI data blocks from the CPRI endpoint over the FlexE PHY group. In other words, for example, the CPRI interface between CPRI endpoints (via a FlexE connection) may be bidirectional. The method 500 may in some examples comprise buffering the CPRI data blocks before the transmitting, buffering the further CPRI data blocks after the receiving, and controlling timing of the buffering of the CPRI data blocks and/or the further CPRI data blocks such that a delay observed by the CPRI data blocks is substantially equal to a delay observed by the further CPRI data blocks over the FlexE PHY group. Such examples may be suitable for use in fronthaul networks, for example.

Figure 6:
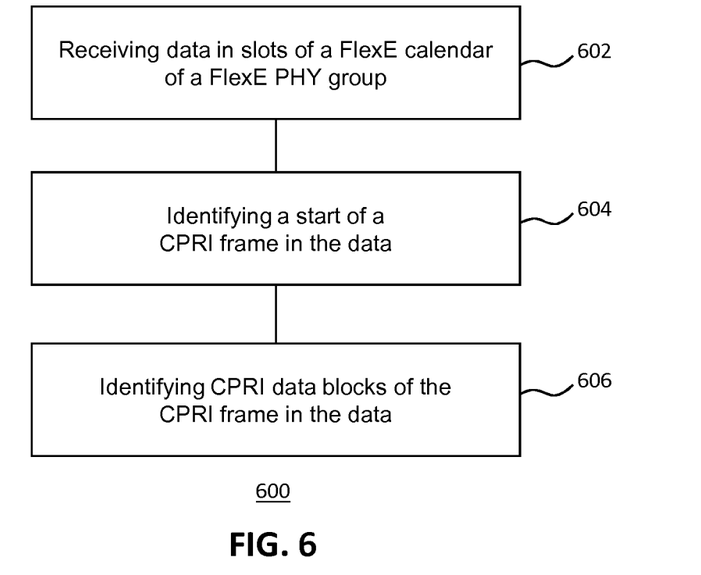
FIG. 6 is a flow chart of an example of a method of receiving data.

FIG. 6 is a flow chart of an example of a method 600 of receiving data. In some examples, the method 500 may be carried out by a node such as FlexE shim 404 or 406. The method 600 comprises, in step 602, receiving data in slots of a FlexE calendar of a Flex Ethernet physical layer group (FlexE PHY group). Step 604 of the method 600 comprises identifying a start of a Common Public Radio Interface (CPRI) frame in the data, and step 606 comprises identifying CPRI data blocks of the CPRI frame in the data. For example, data received in one 66-bit slot may comprise a single 64/66B encoded 66-bit CPRI data block (e.g. unmodified) of the CPRI frame. The start of frame may be identified for example from a start-of-frame control block or any other suitable manner. In some examples, the method 600 of receiving data may receive data transmitted according to the method 500 described above with reference to FIG. 5.

In some examples, a bit rate of the CPRI data blocks is lower than a bit rate of the slots of the FlexE calendar, such as for example two allocated data slots if CPRI line bit rate option 8 is used, or five allocated data slots if CPRI line bit rate option 10 is used. The method 600 may thus further comprise receiving additional data blocks in the slots of the FlexE calendar. The additional blocks may be padding or stuffing blocks. The additional data blocks may comprise FlexE or CPRI control blocks. The additional data blocks may include a timestamp and/or indicate a status of a CPRI communication link for the CPRI data blocks. The timestamp may be used in some examples to synchronize a two-way communication, such as to ensure substantially identical delay in both directions for CPRI data blocks or CPRI frames.

Particular example embodiments will now be described. Embodiments disclosed herein provide a direct mapping and adaptation layer to carry CPRI service types (e.g. CPRI option 8 and CPRI option 10) in the payload frame of a FlexE carrier, without passing through any Ethernet conversion (such as for example CPRI to eCPRI). As part of this mapping, embodiments provide 66b/64b codeword mapping from CPRI option 8 and CPRI option 10 into FlexE codewords. Embodiments may provide a buffering and mapping method to allocate 66b/64b CPRI codewords in the FlexE frame preserving the client signal synchronization by means of timestamping verification in coordination with the FlexE calendaring function. Hence, these embodiments advantageously provide a cost effective method for mapping CPRI over FlexE, meeting customer requirements for 5G transport networks based on FlexE while ensuring back-compatibility with installed CPRI based apparatus.

FlexE is normally designed to accept Ethernet clients, buffering data provided by the clients and allocating the data to the FlexE shim based on the available or allocated time slots in the calendar. Embodiments disclosed herein may bypass the Ethernet framing function at the FlexE client port and map CPRI clients directly leveraging on the agnostic mapping performed by e.g. a 64/66B encoder. Use of CPRI options based on 10B encoding (e.g. CPRI line bit rate option 7) is also possible based for example on conversion from 10B to 66B encoding performed at CPRI transmitter and receiver.

Embodiments of the present disclosure provide methods to map CPRI clients (or FlexE clients that provide CPRI data blocks) in a FlexE shim by the insertion of word stuffing (e.g. additional data blocks) to adapt to the different bit rates between the selected CPRI line bit rate and the allocated calendar slots. In particular, for example an option 8 CPRI link can be mapped as a 10 GBE client (2 FlexE calendar slots), while an option 10 CPRI link can be mapped as a 25 GBE link (5 FlexE calendar slots). In some examples, for a CPRI option 8 flow (10137.6 Mbit/s), mapped into two FlexE calendar slots, a stuffing word may inserted once after 54 or 55 words; for a CPRI option 10 flow (24330.24 Mbit/s) mapped into five FlexE calendar slots, a stuffing word may be inserted once after 17 or 18 words. Stuffing words may be discarded at the receiver or otherwise removed from the flow of CPRI data blocks.

The CPRI specification has two other options with 64/66B encoding: option 7A, with a bit rate of 8110.08 Mbit/s, and option 9, with a bit rate of 12165.12 Mbit/s. The same stuffing method could be applied also for these options, though this may be less efficient than options 8 and 10, as the difference between the CPRI bit rate and the FlexE calendar slots bit rate is greater.

Figure 7:
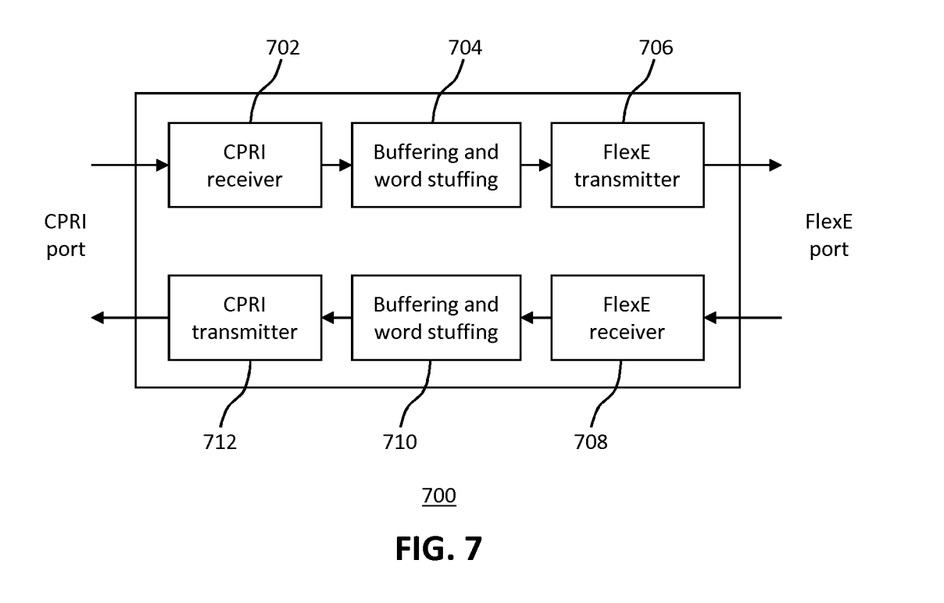
FIG. 7 shows an example of a CPRI endpoint.

FIG. 7 shows an example of a CPRI endpoint 700. The CPRI endpoint includes a CPRI receiver 702 to receive CPRI data from a CPRI port and to provide the data to buffering and word stuffing block 704. The output of this block 704 is provided to FlexE transmitter 706 and subsequently to a FlexE port. In the reverse direction, FlexE receiver 708 receives data from the FlexE port and provides it to buffering and word stuffing block 710. This block provides the data to CPRI transmitter 712 and subsequently to the CPRI port. The FlexE port may be connected to a FlexE shim for example. The CPRI transmitter may be connected to a CPRI device or client for example.

Figure 8:
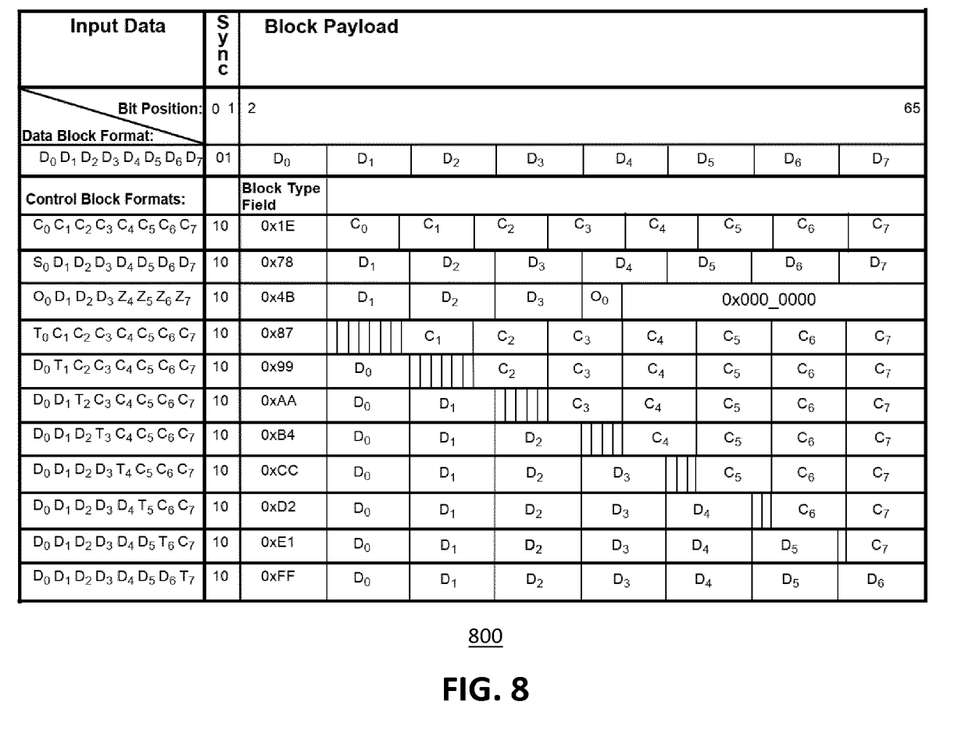
FIG. 8 is a table that shows 64/66B block formats used in FlexE.

Regarding the choice of which codeword (e.g. control word o control block) may be chosen as a stuffing block, the FlexE specification considers each client as a continuous flow of 64/66B coded words or data blocks. The expected codewords are those specified in IEEE 802.3, clause 82, FIG. 82-5, which is reproduced in FIG. 8, which is a table 800 showing 64/66B block formats used in FlexE.

A 66B/64B coded CPRI flow uses only a subset of those codes, as specified in CPRI specification v7.0, which is incorporated herein by reference, specifically in chapter 6.7.1, table 24. This is reproduced in FIG. 9 which is a table 900 that shows 64/66B block formats used in CPRI.

Figure 9:
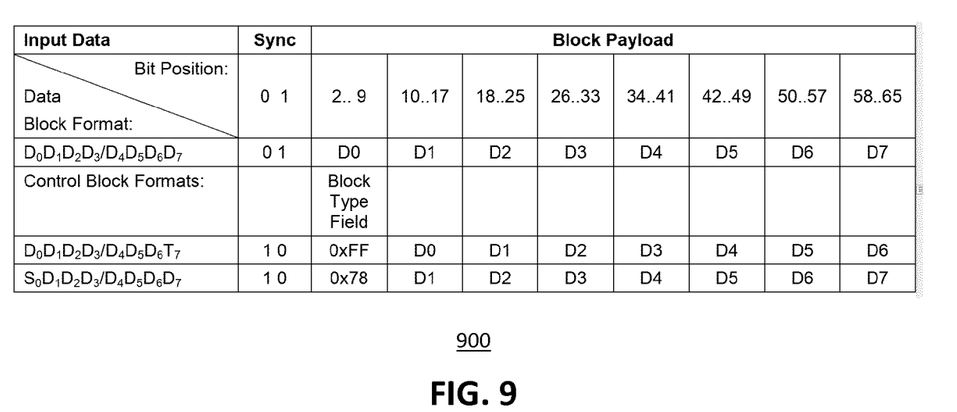
FIG. 9 is a table that shows 64/66B block formats used in CPRI.

Only control block format type field values 0xFF and 0x78 may be used in example implementations of CPRI.

Therefore, in some examples, control blocks with type field values taken from 0x1 E, 0x4B, 0x87, 0x99, 0xAA, 0x64, 0xCC, 0xD2, 0xE1 can be used as a stuffing word or stuffing control block (additional data block), as they are not used for CPRI traffic content. The stuffing word can be used to carry information relevant for CPRI endpoint to CPRI endpoint communication, such as for example timestamps and link status messages.

CPRI endpoints described above need to be synchronized both in frequency and time in order to be compliant with the CPRI specification. Embodiments disclosed herein however may not rely on the fact that the FlexE system is capable of distributing precise sync information between endpoints since a separate sync distribution can be adopted. The buffering function at the CPRI endpoint may in some example take care of absorbing clock rate fluctuations that may occur in the FlexE clock domain with respect to the CPRI clock domain. Delay asymmetries (e.g. uplink vs. downlink) can be compensated for, for example at the CPRI endpoints, with appropriate buffering and by using timestamps taken at CPRI ingress and egress ports.

Figure 10:
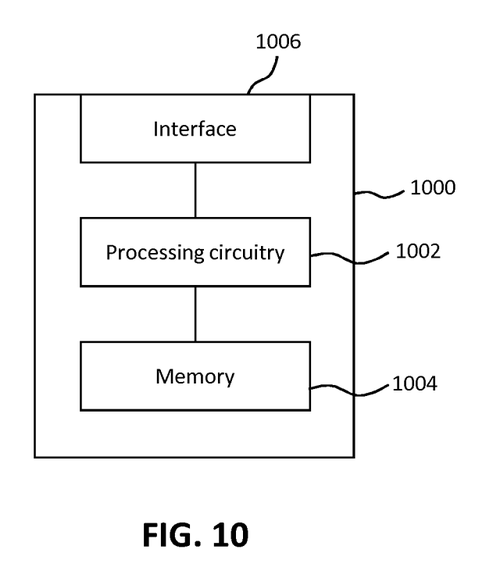
FIG. 10 is a schematic of an example of apparatus for transmitting data.

FIG. 10 is a schematic of an example of apparatus 1000 for transmitting data. The apparatus 1000 comprises processing circuitry 1002 (e.g. one or more processors) and a memory 1004 in communication with the processing circuitry 1002. The memory 1004 contains instructions executable by the processing circuitry 1002. The apparatus 1000 also comprises an interface 1006 in communication with the processing circuitry 1002. Although the interface 1006, processing circuitry 1002 and memory 1004 are shown connected in series, these may alternatively be interconnected in any other way, for example via a bus.

In one embodiment, the memory 1004 contains instructions executable by the processing circuitry 1002 such that the apparatus 1000 is operable to identify a start of a Common Public Radio Interface (CPRI) frame, identify CPRI data blocks of the CPRI frame, and transmit the CPRI data blocks of the CPRI frame in slots of a FlexE calendar of a Flex Ethernet physical layer group (FlexE PHY group).

Figure 11:
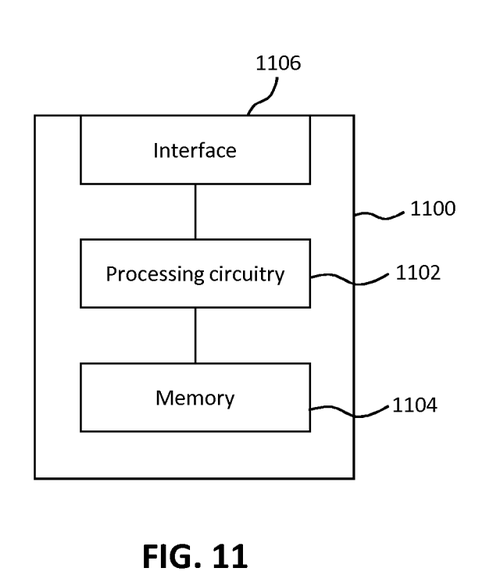
FIG. 11 is a schematic of an example of apparatus for receiving data.

FIG. 11 is a schematic of an example of apparatus 1100 for receiving data. The apparatus 1100 comprises processing circuitry 1102 (e.g. one or more processors) and a memory 1104 in communication with the processing circuitry 1102. The memory 1104 contains instructions executable by the processing circuitry 1102. The apparatus 1100 also comprises an interface 1106 in communication with the processing circuitry 1102. Although the interface 1106, processing circuitry 1102 and memory 1104 are shown connected in series, these may alternatively be interconnected in any other way, for example via a bus.

In one embodiment, the memory 1104 contains instructions executable by the processing circuitry 1002 such that the apparatus 1100 is operable to receive data in slots of a FlexE calendar of a Flex Ethernet physical layer group (FlexE PHY group), identify a start of a Common Public Radio Interface (CPRI) frame in the data, and identify CPRI data blocks of the CPRI frame in the data.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of transmitting data, the method comprising:
   identifying a start of a Common Public Radio Interface, CPRI, frame;
   identifying CPRI data blocks of the CPRI frame; and
   transmitting the CPRI data blocks of the CPRI frame in slots of a FlexE calendar of a Flex Ethernet physical layer group, FlexE PHY group, wherein the FlexE calendar is configured to arrange the CPRI data blocks for scheduling for transmission on the FlexE PHY group, wherein the FlexE calendar is selected in response to:
       transmitting a calendar switch request to a receiving entity that a calendar configuration associated with the FlexE calendar to be used over a current calendar configuration; and
       receiving a calendar switch acknowledgement from the receiving entity;
   wherein a bit rate of the CPRI data blocks is lower than a bit rate of the slots of the FlexE calendar, and the method further comprises
   transmitting additional data blocks in the slots of the FlexE calendar, wherein the additional data blocks include a timestamp and/or indicate a status of a CPRI communication link for the CPRI data blocks.

2. The method of claim 1, wherein transmitting the CPRI data blocks in slots of the FlexE calendar comprises transmitting the CPRI data blocks unmodified.

3. The method of claim 1, wherein the additional data blocks comprise FlexE or CPRI control blocks.

4. The method of claim 1, wherein the slots of the FlexE calendar are reserved for a CPRI interface for the CPRI frame.

5. The method of claim 1, wherein the slots of the FlexE calendar are substantially evenly spaced in time.

6. The method of claim 5, wherein the blocks in the FlexE calendar comprise non-consecutive blocks.

7. The method of claim 1, comprising obtaining the CPRI data blocks at a rate according to CPRI line bit rate option 8, and wherein transmitting the CPRI data blocks in slots of the FlexE calendar comprises allocating two slots in the FlexE calendar for the CPRI data blocks.

8. The method of claim 1, comprising obtaining the CPRI data blocks at a rate according to CPRI line bit rate option 10, and wherein transmitting the CPRI data blocks in slots of the FlexE calendar comprises allocating five slots in the FlexE calendar for the CPRI data blocks.

9. The method of claim 1, wherein transmitting the CPRI data blocks in slots of the FlexE calendar comprises transmitting the CPRI data blocks to a CPRI endpoint, and the method comprises receiving further CPRI data blocks from the CPRI endpoint over the FlexE PHY group.

10. The method of claim 9, comprising buffering the CPRI data blocks before the transmitting, buffering the further CPRI data blocks after the receiving, and controlling timing of the buffering of the CPRI data blocks and/or the further CPRI data blocks such that a delay observed by the CPRI data blocks is substantially equal to a delay observed by the further CPRI data blocks over the FlexE PHY group.

11. A method of receiving data, the method comprising:
receiving data in slots of a FlexE calendar of a Flex Ethernet physical layer group, FlexE PHY group;
identifying a start of a Common Public Radio Interface, CPRI, frame in the data; and
identifying CPRI data blocks of the CPRI frame in the data, wherein the FlexE calendar is configured to arrange the CPRI data blocks for scheduling for transmission on the FlexE PHY group, wherein the FlexE calendar is selected in response to:
receiving a calendar switch request from a transmitting entity that a calendar configuration associated with the FlexE calendar to be used over a current calendar configuration; and
transmitting a calendar switch acknowledgement to the transmitting entity;
wherein a bit rate of the CPRI data blocks is lower than a bit rate of the slots of the FlexE calendar, and the method further comprises
receiving additional data blocks in the slots of the FlexE calendar, wherein the additional data blocks include a timestamp and/or indicate a status of a CPRI communication link for the CPRI data blocks.

12. The method of claim 11, wherein receiving the data comprises receiving the CPRI data blocks unmodified in the slots of the FlexE calendar.

13. The method of claim 11, wherein the additional data blocks comprise FlexE or CPRI control blocks.

14. The method of claim 11, comprising providing the CPRI data blocks to a FlexE client, wherein the FlexE client comprises a baseband processing node, a radio equipment control (REC) node or a radio equipment (RE) node.

15. The method of claim 11, wherein the blocks of the FlexE calendar correspond to time slots of the data that are substantially evenly spaced in time.

16. Apparatus for transmitting data, the apparatus comprising processing circuitry and a memory, the memory containing instructions executable by the processing circuitry such that the apparatus is operable to:
identify a start of a Common Public Radio Interface, CPRI, frame;
identify CPRI data blocks of the CPRI frame; and
transmit the CPRI data blocks of the CPRI frame in slots of a FlexE calendar of a Flex Ethernet physical layer group, FlexE PHY group, wherein the FlexE calendar is configured to arrange the CPRI data blocks for scheduling for transmission on the FlexE PHY group, wherein the FlexE calendar is selected in response to:
transmission of a calendar switch request to a receiving entity that a calendar configuration associated with the FlexE calendar to be used over a current calendar configuration; and
reception of a calendar switch acknowledgement from the receiving entity;
wherein a bit rate of the CPRI data blocks is lower than a bit rate of the slots of the FlexE calendar, and the memory contains instructions executable by the processing circuitry such that the apparatus is operable to transmit additional data blocks in the slots of the FlexE calendar, wherein the additional data blocks include a timestamp and/or indicate a status of a CPRI communication link for the CPRI data blocks.

17. The apparatus of claim 16, wherein the memory contains instructions executable by the processing circuitry such that the apparatus is operable to transmit the CPRI data blocks in slots of the FlexE calendar by transmitting the CPRI data blocks unmodified.

18. The apparatus of claim 16, wherein the memory contains instructions executable by the processing circuitry such that the apparatus is operable to obtain the CPRI frame from a FlexE client, wherein the FlexE client comprises a baseband processing node, a radio equipment control (REC) or a radio equipment (RE) node.

19. The apparatus of claim 16, wherein the memory contains instructions executable by the processing circuitry such that the apparatus is operable to transmit the CPRI data blocks in slots of the FlexE calendar by transmitting the CPRI data blocks to a CPRI endpoint, and the the memory further contains instructions executable by the processing circuitry such that the apparatus is operable to receive further CPRI data blocks from the CPRI endpoint over the FlexE PHY group.

20. Apparatus for receiving data, the apparatus comprising processing circuitry and a memory, the memory containing instructions executable by the processing circuitry such that the apparatus is operable to:
receive data in slots of a FlexE calendar of a Flex Ethernet physical layer group, FlexE PHY group;
identify a start of a Common Public Radio Interface, CPRI, frame in the data; and
identify CPRI data blocks of the CPRI frame in the data, wherein the FlexE calendar is configured to arrange the CPRI data blocks for scheduling for transmission on the FlexE PHY group, wherein the FlexE calendar is selected in response to:
reception of a calendar switch request from a transmitting entity that a calendar configuration associated with the FlexE calendar to be used over a current calendar configuration; and
transmission of a calendar switch acknowledgement to the transmitting entity;
wherein a bit rate of the CPRI data blocks is lower than a bit rate of the slots of the FlexE calendar, and the memory contains instructions executable by the processing circuitry such that the apparatus is operable to
receive additional data blocks in the slots of the FlexE calendar, wherein the additional data blocks include a timestamp and/or indicate a status of a CPRI communication link for the CPRI data blocks.

21. The apparatus of claim 20, wherein the memory contains instructions executable by the processing circuitry such that the apparatus is operable to receive the CPRI data blocks unmodified in the slots of the FlexE calendar.

22. The apparatus of claim 20, wherein the memory contains instructions executable by the processing circuitry such that the apparatus is operable to provide the CPRI data blocks to a FlexE client, wherein the FlexE client comprises a baseband processing node, a radio equipment control (REC) node or a radio equipment (RE) node.

* * * * *